United States Patent
Matsuda et al.

(10) Patent No.: US 7,447,218 B2
(45) Date of Patent: Nov. 4, 2008

(54) COMMUNICATION SERVICE UNIT AND CONNECTION SEQUENCE OPERATING METHOD

(75) Inventors: Yukinari Matsuda, Tokyo (JP); Susumu Oka, Tokyo (JP); Yukiyasu Kawahata, Tokyo (JP); Hiroshi Honma, Tokyo (JP); Morio Yoshimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 478 days.

(21) Appl. No.: 10/545,809

(22) PCT Filed: Feb. 19, 2004

(86) PCT No.: PCT/JP2004/001871

§ 371 (c)(1),
(2), (4) Date: Aug. 16, 2005

(87) PCT Pub. No.: WO2004/075508

PCT Pub. Date: Sep. 2, 2004

(65) Prior Publication Data

US 2006/0193345 A1 Aug. 31, 2006

(30) Foreign Application Priority Data

Feb. 24, 2003 (JP) ............................. 2003-045650

(51) Int. Cl.
*H04L 12/28* (2006.01)
*H04J 3/16* (2006.01)

(52) U.S. Cl. ....................................... 370/401; 370/466
(58) Field of Classification Search ........................ None
See application file for complete search history.

(56) References Cited

U.S. PATENT DOCUMENTS 6,535,486 B1 * 3/2003 Naudus et al. .............. 370/235

(Continued)

FOREIGN PATENT DOCUMENTS

JP 10-334007 12/1998

(Continued)

*Primary Examiner*—Andrew Lee
(74) *Attorney, Agent, or Firm*—Oblon, Spivak, McClelland, Maier & Neustadt, P.C.

(57) ABSTRACT

Communication is performed without paying attention to the fact that the communication is executed between multimedia terminals having communication procedures differing from each other.

A terminal 2 starts a communication procedure that is necessary to establish a communication path to a communication service unit 1, in order to execute communication with a multimedia terminal 3; when a communication protocol conversion unit 7 receives communication start request from the terminal 2, the communication service unit executes identification process of a calling terminal based on the identification number, which exists in communication start request, for determining the multimedia terminal 2, and inquires a terminal information managing unit 9 of the calling terminal. The terminal information managing unit 9 retrieves terminal information related to the calling terminal based on a terminal information request, and informs of the retrieved terminal information to the communication protocol conversion unit 7. The communication protocol conversion unit 7 informs of the communication start request to the terminal 3 when the transmitting the terminal information of the terminal 2 is obtained, and continues a relay process in communication procedure, which is necessary for following establishment of a communication path.

10 Claims, 7 Drawing Sheets

U.S. PATENT DOCUMENTS

| | | | |
|---|---|---|---|
| 2001/0010490 A1* | 8/2001 | Bellin | 340/7.46 |
| 2002/0087704 A1* | 7/2002 | Chesnais et al. | 709/228 |
| 2004/0061773 A1* | 4/2004 | Liu | 348/14.02 |
| 2004/0153500 A1* | 8/2004 | Ide et al. | 709/203 |
| 2006/0178918 A1* | 8/2006 | Mikurak | 705/7 |

FOREIGN PATENT DOCUMENTS

| | | |
|---|---|---|
| JP | 11-296455 | 10/1999 |
| JP | 2000-138970 | 5/2000 |
| JP | 2000-244582 | 9/2000 |
| JP | 2000-253403 | 9/2000 |
| JP | 2000-270024 | 9/2000 |
| JP | 2000-285043 | 10/2000 |
| JP | 2001-313937 | 11/2001 |

* cited by examiner

CALLING TERMINAL INFORMATION

| PHONE NUMBER OR SIP ADDRESS | ENCODING CAPABILITY FOR MEDIA | DCI |
|---|---|---|
| 03-1234-5678 | VIDEO : MPEG-4, H.236<br>AUDIO : AMR, G723.1 | 0x00, 0x00, 0X01, 0xB0 |
| XXX@OO.co.jp | | |
| | | |

NOTE1: "0x00" IS IN HEXADECIMAL NUMBER SYSTEM.
NOTE2: "DCI" IS INFORMATION RELATED TO ENCODING CONTROL APPLIED IN VIDEO ENCODING METHOD MPEG-4.
(DECODER CONFIGURATION INFORMATION)

COMMUNICATION SERVICE UNIT AND CONNECTION SEQUENCE OPERATING METHOD

TECHNICAL FIELD

The present invention is related to a communication service unit and a connection sequence operating method for packet-multiplexing encoded media information such as video, audio or data, and transmitting the media information.

BACKGROUND ART

Various standards for multiplex-transmitting information of each multimedia have been established, with respect to multimedia terminals for realizing services such as a videophone by transmitting media information such as video, audio or data.

With respect to multimedia terminals for realizing TV phone service provided by the W-CDMA third generation mobile phones, for example, the ITU-T (International Telecommunication Union-Telecommunication Standardization Sector) Recommendation, H.324 (Terminal for low bit-rate multimedia communication) is applied as one of the standards for multiplex-transmitting multimedia information. In a multimedia terminal in conformity with the international recommendation, the ITU-T Recommendation, H.324, the international recommendation, the ITU-T Recommendation, H.245 is applied as the AV communication control protocol that exchanges various setting for transmitting media information and determine, meanwhile the international recommendation, the ITU-T Recommendation, H.223 (Multiplexing protocol for low bit rate multimedia communication), is applied as a multimedia multiplexing system.

Moreover, in a multimedia terminal for realizing TV phone service used in internet communication, for example, the IETF (Internet Engineering Task Force) Standard, SIP (Session Initiation Protocol) is applied as one of the standards for multiplex-transmitting multimedia information. In a multimedia terminal in conformity with the IETF Standard, SIP, the IETF Standard, RTP (Real time Transport Protocol)/RTCP (Real time Transport Control Protocol) is applied as a multimedia-multiplex system.

In communication among multimedia terminals, it is necessary not only to establish a communication path for transmitting information, but also to establish an encoding method for media information or a transmission method for encoded media information, with respect to media information such as video or audio, etc. that is actually transmitted and received among the terminals. In the ITU-T Recommendation, H.324, multimedia communication among multimedia terminals is established through two steps including a communication procedure for establishing a communication path, referred to as "Call control procedure", and a communication procedure for establishing the encoding method for media information of video or audio, etc. or the transmission method for the encoded media information after communication such as called "AV media control sequence has been established". On the other hand, in the IETF Standard, SIP, multimedia communication among multimedia terminals is established by a communication procedure that concurrently establishes a communication path and an encoding method of media information such as video and audio or a transmission method for the encoded media information. That is, with respect to communication information related to video and audio, for example, encode capability of media, in the multimedia terminal in conformity with the ITU-T Recommendation, H.324, information transmission and determination are performed in the media control procedure after having established the communication path, and in the multimedia terminal in conformity with the IETF Standard, SIP, information transmission and determination are performed in the call-control and media-control procedures associated with the establishment of communication paths.

Therefore, there causes a problem in that notifying timings of terminal information related to media information are different, when mutual communication is realized among the multimedia terminals in conformity with the ITU-T Recommendation, H.324 and the multimedia terminal in conformity with the IETF Standard, SIP, which have different communication procedures. For example, there is a problem in that the multimedia terminal in conformity with the ITU-T Recommendation, H.324 can not inform the multimedia terminal in conformity with the IETF Standard, SIP, when they try to mutually communicate, because the terminal information related to media information of a calling terminal requesting communication start is not included in the communication procedure of the terminals in conformity with the ITU-T Recommendation, H.324 at the time of communication start.

Coping with the above problems, in Japanese Laid-Open Open Patent Publications 1998-334007 and 2000-285043, it is described, as an email type facsimile device, how to relay between the different communication procedures in which information is transmitted through an IP network and through a circuit exchange network. Even in communication of facsimile devices, it is necessary to inform each other of terminal information such as receivable data type or video quality selection between transmitting facsimile devices and receiving facsimile devices, and therefore the solutions to the problems are now disclosed.

In particular, the prior art described in Japanese Laid-Open Open Patent Publications 1998-334007 includes a transmitting facsimile type email device, a facsimile type email device as a relay unit, a server, and a receiving facsimile device. Their terminal information such as telephone number of the facsimile device, mail address, receivable data type or video quality selection is managed in the server. In this situation, it is pointed out that the information is automatically registered in a database of the server, if an operator inputs information items corresponding to the terminal information and transmits the input information by predetermined operation. Then, the transmitting facsimile device can obtain the terminal information in the database by inquiring the terminal information on the receiving facsimile device when facsimile transmitting, select a most suitable transmitting method, and transmit the facsimile information.

Moreover, the prior art described in Japanese Laid-Open Open Patent Publications 2000-285043 includes, in an environment composed of plural IP networks, a DNS (domain name system) server and a means for inquiring another server of terminal information to obtain the information if the terminal information is not stored in the database of the server. Therefore, even if the terminal information related to the receiving facsimile device has not been stored directly, the terminal information may possibly be obtained, for example, by inquiring a server in the IP network in which the terminal is included, and facsimile information can be transmitted in a wider-area network environment. At this moment, by automatically registering the terminal information obtained from another server into its own server, the terminal information of the receiving facsimile device can be obtained swiftly from the next time onward.

As described above, in a multimedia terminal in conformity with the ITU-T Recommendation, H.324, two steps of procedures are executed, in which a transmission path (call control procedure) and media communication (AV media control procedure) are established. On the other hand, in a multimedia terminal in conformity with the IETF Standard, SIP, the call control procedure and the AV media control procedure are executed at the same time. Therefore, when both the terminals are mutually connected, there may be a problem in that necessary information is insufficiently exchanged due to the difference of the communication procedures.

Moreover, in the method for obtaining the terminal information related to the receiving facsimile devices disclosed in above Japanese Laid-Open Open Patent Publications 1998-334007 or 2000-285043, necessary information items must be inputted by an operator in advance. In other words, the specification related to the receiving facsimile devices must be obtained. Moreover, if there is information that can not be usually recognized because the information is only exchanged by communication procedures between the devices, a problem occurs in that the present method can not be applied.

In the multimedia terminals such as those in conformity with the ITU-T Recommendation, H.324 or in conformity with the IETF Standard, SIP, in addition to information items selected by a user through an operation panel, etc., there exists terminal information that is determined by specific device specifications such as, for example, parameters related to a media encoding method or parameters related to a multiplex-transmission system for encoded media information, exchanged only by communication procedures among the terminals, and that can not be usually recognized.

Therefore, the present invention has been made accordingly in order to provide a communication service unit and an operation method for performing connection sequence, wherein information including the terminal information that the user can not obtain can be easily and automatically registered into the database, and, even in the case of communication between the multimedia terminals having communication procedures differing from each other, the user can start mutual communication without paying attention to the fact that those terminals have communication procedures differing from each other.

DISCLOSURE OF THE INVENTION

In order to solve the above-described problems, in the present invention, it is basically addressed that, when a communication protocol is converted and relayed at the time of transmitting information from one of terminals to another terminal, having different protocol systems, the calling terminal is identified, the terminal information related to the calling terminal is retrieved from the terminal information stored in advance, and the connection sequence with the called terminal is carried out using the retrieved terminal information. In particular, when the terminal information related to the calling terminal does not exist, communication connection to the called terminal is not executed, but a quasi communication procedure for obtaining the terminal information of the calling terminal is executed, so that the terminal information of the calling terminal is obtained and registered.

According to this invention as explained above, because the communication service unit is situated among communication terminals having communication protocol systems differing from each other; when a communication protocol is converted and relayed while information is transmitted from one of terminals to another, the terminal information related to a calling terminal is retrieved from the prerecorded terminal information by identifying the calling terminal; and a connection sequence with the called terminal is basically executed by using the retrieved terminal information, if the communication is executed between the multimedia terminals having communication procedures differing from each other, these terminals can mutually start communication without recognizing that those terminals have communication procedures differing from each other.

In particular, because, when the terminal information related to the calling terminal does not exist, communication connection to the called terminal is not executed, but quasi communication procedure for obtaining the terminal information of the calling terminal is executed, so that the terminal information of the calling terminal is obtained and registered, the terminal information can be automatically obtained even if the terminal information related to the calling terminal does not exist.

BEST MODE FOR CARRYING OUT THE INVENTION

Embodiment 1

Figure 1:
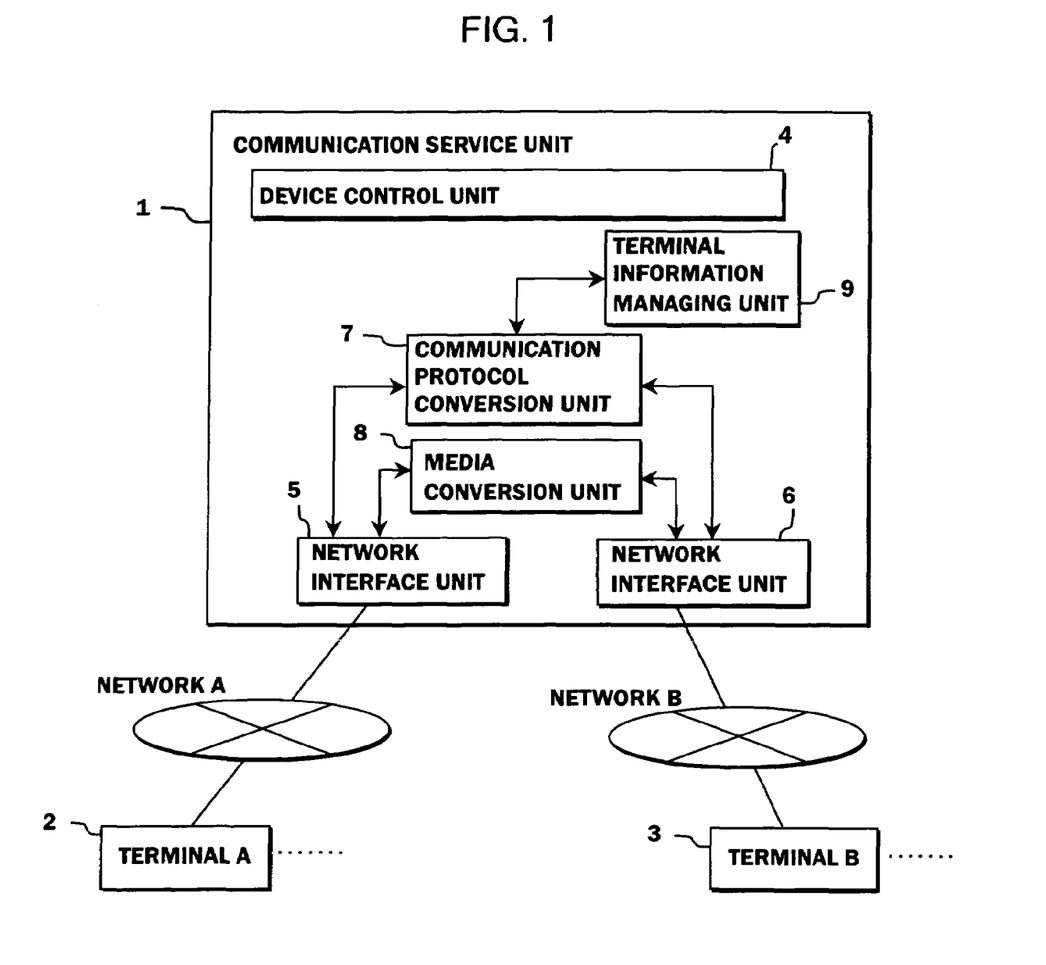
FIG. 1 is a block diagram illustrating a communication service unit according to Embodiment 1 of the invention.

FIG. 1 is a block diagram illustrating a communication service unit according to Embodiment 1 of the invention.

In FIG. 1, "1" is an overall view of the communication service unit for realizing mutual communication among multimedia terminals having communication procedures differing from each other, "2" is a multimedia terminal for transmitting transmission stream to which media information such as video or audio is encoded and multiplexed, or, to the contrary, for receiving the transmission stream, and decoding encoded media information such as video or audio to obtain separated video or audio from the transmission stream, and "3" is a multimedia terminal having communication procedure differing from communication procedure of the multimedia terminal 2. Moreover, "4" is a device control unit for controlling the communication service unit 1, "5" is a network interface unit for transmitting and receiving the transmission stream through the multimedia terminal 2 and a network A, and "6" is a network interface unit for transmitting and receiving the transmission stream through the multimedia terminal 3 and a network B. The network interface units 5 and 6 have functions for transmitting and receiving media information or communication control information such as video or audio, as transmission streams, according to the standard to which multimedia terminals that are the communication target of each network interface, conform. "7" is a communication protocol conversion unit for mutually translating and relaying the communication control information from the multimedia terminals 2 and 3 through the network interface units 5 and 6, "8" is a media conversion unit for mutually translating and relaying encoded media information such as video or audio, from the multimedia terminals 2 and 3 through the network interfaces unit 5 and 6, and "9" is a terminal information managing unit for managing terminal information related to the multimedia terminals, which are a target of mutual communication.

Next, operations in Embodiment 1 are explained. In this case, as one of examples, operations in a mutual communication from the multimedia terminal 2 to the multimedia terminal 3 through the communication service unit 1 are explained.

Figure 2:
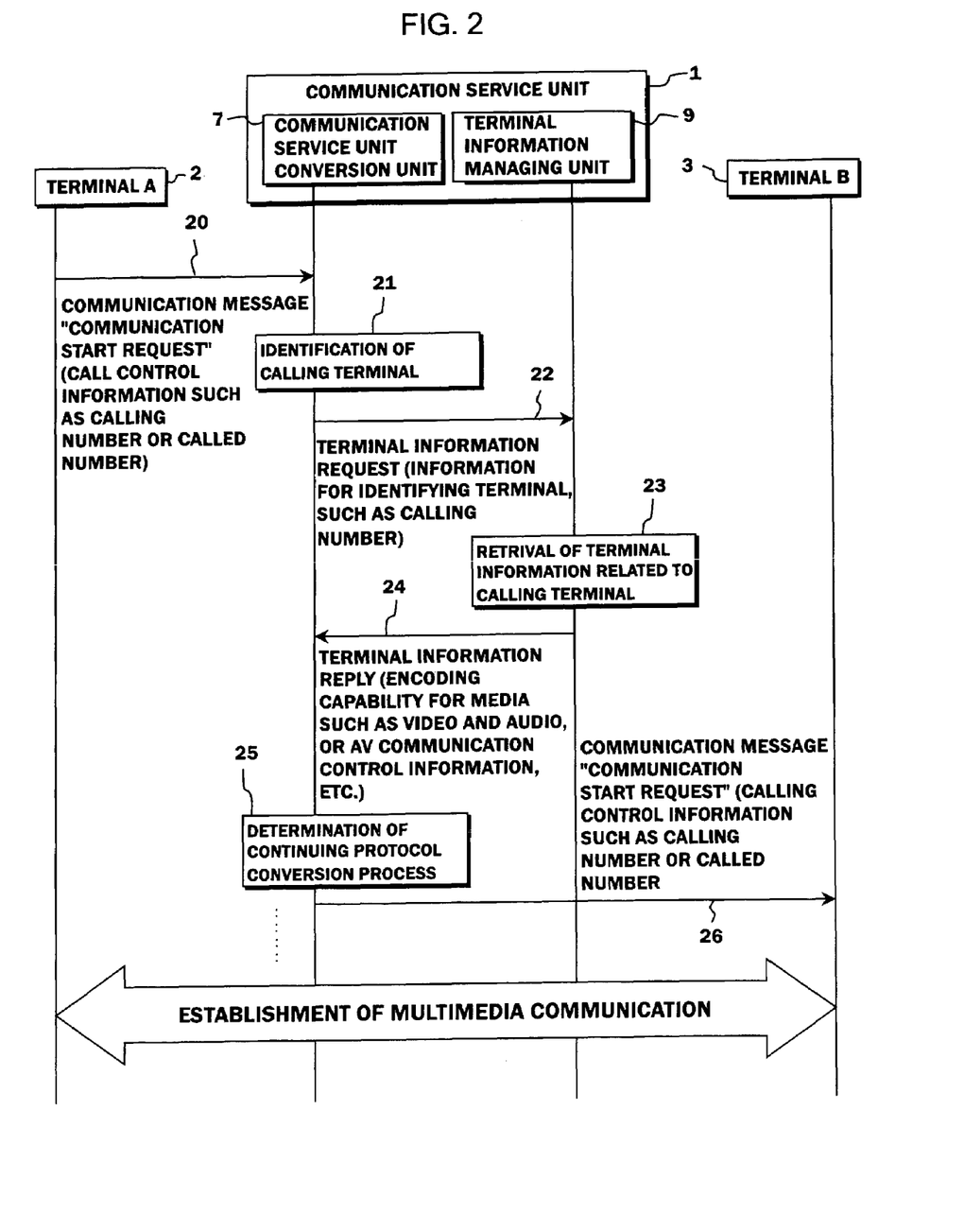
FIG. 2 is a diagram illustrating an example of sequence at the communication start according to Embodiment 1.

FIG. 2 is a diagram illustrating an example of sequence at the time of communication start according to Embodiment 1.

The multimedia terminal 2, in order to execute mutual communication with the multimedia terminal 3, starts a communication procedure that is necessary to establish a communication path to the communication service unit 1. The communication service unit 1 executes a communication procedure, concerning communication start from the multimedia terminal 2, in the communication protocol conversion unit 7 through the network interface unit 5 under the unitary control by the device control unit 4. Then, the communication protocol conversion unit 7 protocol-converts the communication message that is reported from the multimedia terminal 2, which is the calling terminal, and starts communication to the multimedia terminal 3 through the network interface unit 6. At this moment, if the communication protocol conversion unit 7 receives a communication massage 20, requesting communication start, which is reported from the multimedia terminal 2, which is the calling terminal, the unit executes calling terminal identification process 21 based on the identification number for determining the multimedia terminal 2, which exists in the communication start request 20, that is, for example, a transmitting phone number in the case of the multimedia terminal in conformity with the ITU-T Recommendation, H.324, or a terminal address, referred to as the SIP-URL in IP network, in the case of multimedia terminal in conformity with the IETF Standard, SIP. Then, the conversion unit informs the terminal information managing unit 9 of inquiry on the calling terminal in accordance with terminal information request 22.

The terminal information managing unit 9 executes retrieving process 23 for the terminal information related to the calling terminal in accordance with the terminal information request 22. Then, the terminal information, which is the detected result, related to the calling terminal is reported by a terminal information reply 24. The communication protocol conversion unit 7 executes determination process 25 as to whether the protocol conversion process is continued, in accordance with the terminal information reply 24. At this moment, if the calling terminal information of the multimedia terminal 2, which is the calling terminal, has been obtained, a communication message 26 relating to communication start request is reported to the multimedia terminal 3, and relay process of communication procedure, which is necessary to following establishment of communication path, is continuously executed. Then, media control procedure, which is necessary to multimedia transmission between the multimedia terminal 2 and multimedia terminal 3, is executed.

At this moment, if the multimedia terminal 2 and multimedia terminal 3 have communication procedures differing from each other, the quantity and contents of communication messages reported from both the multimedia terminals are different, and those do not always correspond one to one. In this case, the calling terminal information obtained by the communication protocol conversion unit 7 is applied, and the communication message is converted according to need.

Moreover, the database related to the terminal information, which is referred in the retrieving process 23 of the terminal information by the terminal information managing unit 9 may be managed in the communication service unit 1, or may be unitarily managed to be inquired, by a dedicated server outside the communication service unit 1.

Accordance to Embodiment 1 as described above, even if the terminal information, which is necessary for communication start procedure, is insufficient, when mutual communication is executed between the multimedia terminal 2 and the multimedia terminal, 3 having communication procedures differing from each other, an effect can be obtained, in which mutual communication can be realized, without recognizing that the communication is executed between the multimedia terminal 2 and the multimedia terminal 3, having communication procedures differing from each other, by compensating the obtained terminal information with the retrieved terminal information related to the calling terminal in the communication service unit 1.

Embodiment 2

Because a block diagram of Embodiment 2 is identical to FIG. 1, which is the block diagram of Embodiment 1, explanation of the configuration is omitted, and operations of Embodiment 2 are explained. Here, as an example, operations in mutual communication from the multimedia terminal 2 to the multimedia terminal 3 through the communication service unit 1 are explained.

Figure 3:
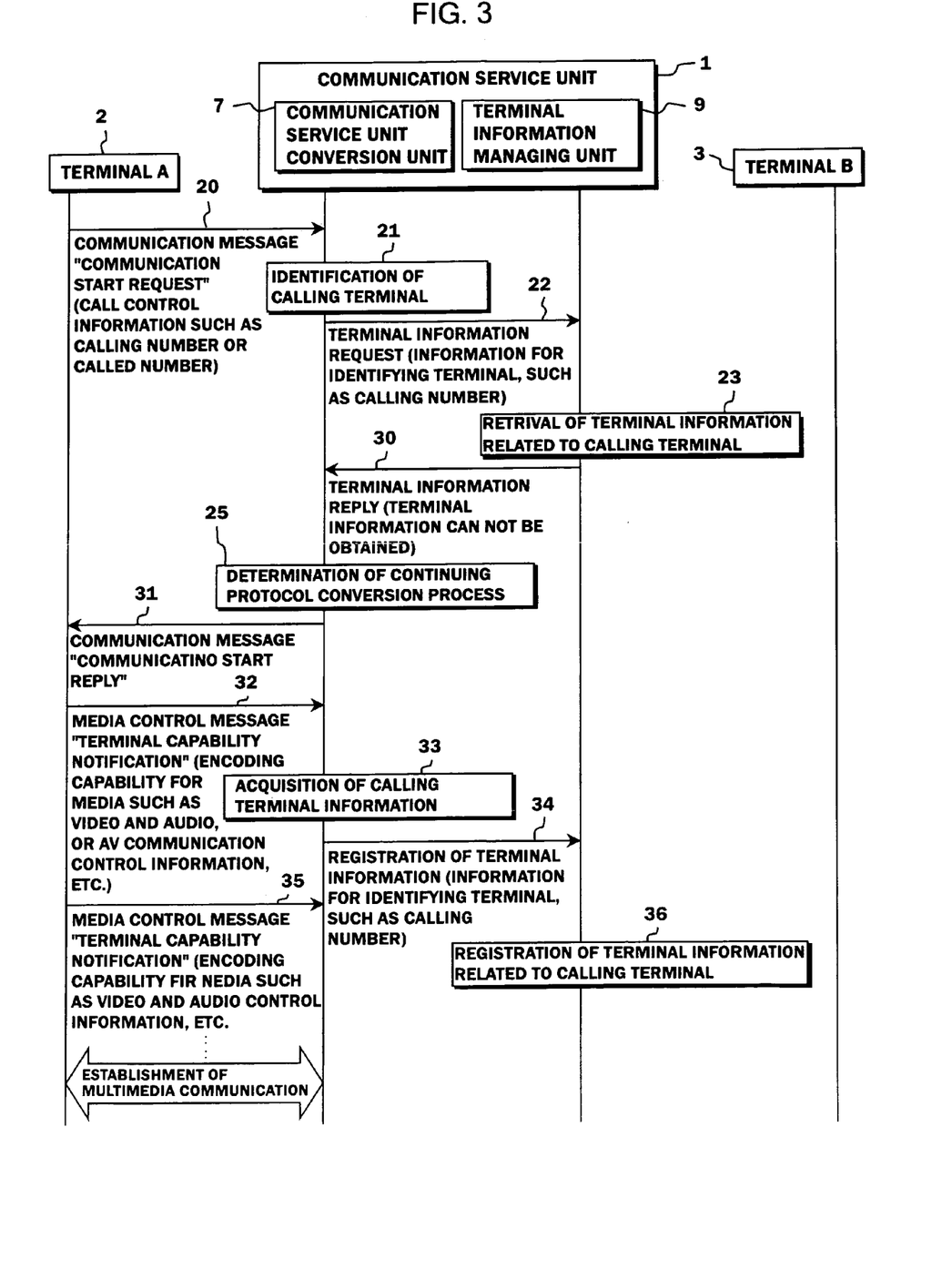
FIG. 3 is a diagram illustrating an example of sequence at the communication start according to Embodiment 2.

FIG. 3 is a diagram illustrating an example of sequence at the communication start according to Embodiment 3.

In the communication service unit 1, as described in Embodiment 1, when the communication massage 20 included in the communication start request 20 is received from the multimedia terminal 2, terminal information related to the multimedia terminal 2, which is a calling terminal, is inquired by the terminal information request 22 to the terminal information managing unit 9. The terminal information managing unit 9 executes the retrieving process 23 of the terminal information related to the calling terminal according to the terminal information request 22. Then, the terminal information related to the calling terminal is reported by a terminal information reply 30. At this moment, if the terminal information related to the calling terminal does not exist in the database, a message that the terminal information can not be obtained is reported by the terminal information reply 30. The communication protocol conversion unit 7 executes the determination process 25 as to whether the protocol conversion process is continued by the terminal information reply 30, and if the calling terminal information of the multimedia terminal 2 has not been obtained, communication to the multimedia terminal 3 is not executed and a following process progresses to acquire the terminal information from the multimedia terminal 2.

The communication protocol conversion unit 7 executes quasi communication procedure, which is necessary for the multimedia terminal 2 in establishing a communication path, by informing the multimedia terminal 2 of a communication message 31 of a communication start reply. After the establishment of the communication path, the multimedia terminal 2 starts a communication procedure, which is necessary for multimedia transmission. At this moment, if a media control message 32 as to terminal capability notification reported from the multimedia terminal 2, is received, information related to multimedia transmission of the multimedia terminal 2, which is a calling terminal is extracted from the terminal capability notification 32, and a process 33 is executed to obtain information related to the calling terminal. Next, the communication protocol conversion unit 7 informs the terminal information managing unit 9 of the information registration of the calling terminal in accordance with terminal information registration 34. The terminal information managing unit 9 executes a registration process 36 of the terminal information related to the calling terminal in accordance with the terminal information registration 34. Meanwhile, quasi communication procedure, which is necessary for multimedia transmission of the multimedia terminal 2, is executed by informing the multimedia terminal 2 of a media control message 35 as to the terminal capability notification.

At this moment, if the multimedia terminal 2 and multimedia terminal 3 have communication procedures differing from each other, the quantity and contents of communication messages reported from both the multimedia terminals are different, and those does not always correspond one to one. In this case, the calling terminal information obtained by the communication protocol conversion unit 7 is applied, and the communication message is converted according to need. Moreover, every time the terminal information related to the calling terminal is reported by other media control message that the multimedia terminal 3 informs of, the terminal information registration process 36 of the calling terminal may be executed. After that, the communication may once be terminated in accordance with the operator's decision as to the multimedia terminal 2, and then the communication to the multimedia terminal 3 may be started again. In this case, because the terminal information of calling terminal is registered in the database, multimedia communication between the multimedia terminal 2 and the multimedia terminal 3 is established based on the procedure illustrated in FIG. 1 in the communication service unit 1.

Moreover, the database related to terminal information, which the terminal information managing unit 9 refers in the retrieving process 23 of terminal information, may be managed in the communication service unit 1, or may be unitarily managed to be inquired, by a dedicated server outside the communication service unit 1.

According to Embodiment 2 as described above, even if the terminal information related to the calling terminal, which is necessary for the communication procedure, is insufficient, when mutual communication is executed between the multimedia terminal 2 and the multimedia terminal 3 having communication procedures differing from each other, an effect can be exerted, in which, in the communication service unit 1, the terminal information can be automatically obtained from the calling terminal without inputting information through complicated procedures by the operator.

Embodiment 3

Because a block diagram of Embodiment 3 is identical to FIG. 1, which is the block diagram of Embodiment 1, explanation of the configuration is omitted, and operations of Embodiment 3 are explained. Here, as an example, operations in mutual communication from the multimedia terminal 2 to the multimedia terminal 3 through the communication service unit 1 are explained.

When terminal information related to the calling terminal does not exist in the database as described in FIG. 3, quasi multimedia communication is established after having established a communication path between the multimedia terminal 2 and the communication service unit 1, and exchanged a series of communication messages or media control messages, which are necessary for establishment of the communication path and establishment of media transmission, so as to obtain the terminal information related to the multimedia terminal 2, which is a calling terminal.

At this moment, in Embodiment 3, multimedia communication from the communication service unit 1 to the multimedia terminal 3 is established, while holding quasi multimedia communication, which has been established between the multimedia terminal 2 and the communication service unit 1. In this case, after establishment of multimedia communication by executing communication procedures for establishing the communication path and for establishing media transmission, multimedia communication progresses to that between the multimedia terminal 2 and the multimedia terminal 3 by relaying each of multimedia communication between the multimedia terminal 2 and the communication service unit 1, and multimedia communication between the communication service unit 1 and the multimedia terminal 3.

According to Embodiment 3 as described above, if the terminal information, which is necessary for the communication start procedure, is insufficient when mutual communication is executed between the multimedia terminal 2 and the multimedia terminal 3 having communication procedures differing from each other, an effect can be exerted, in which, in the communication service unit 1, the terminal information can be automatically obtained from the calling terminal without inputting information in accordance with complicated procedures by the operator, and the multimedia information can be automatically established in the multimedia terminal 3, which is a destination terminal.

Embodiment 4

Figure 4:
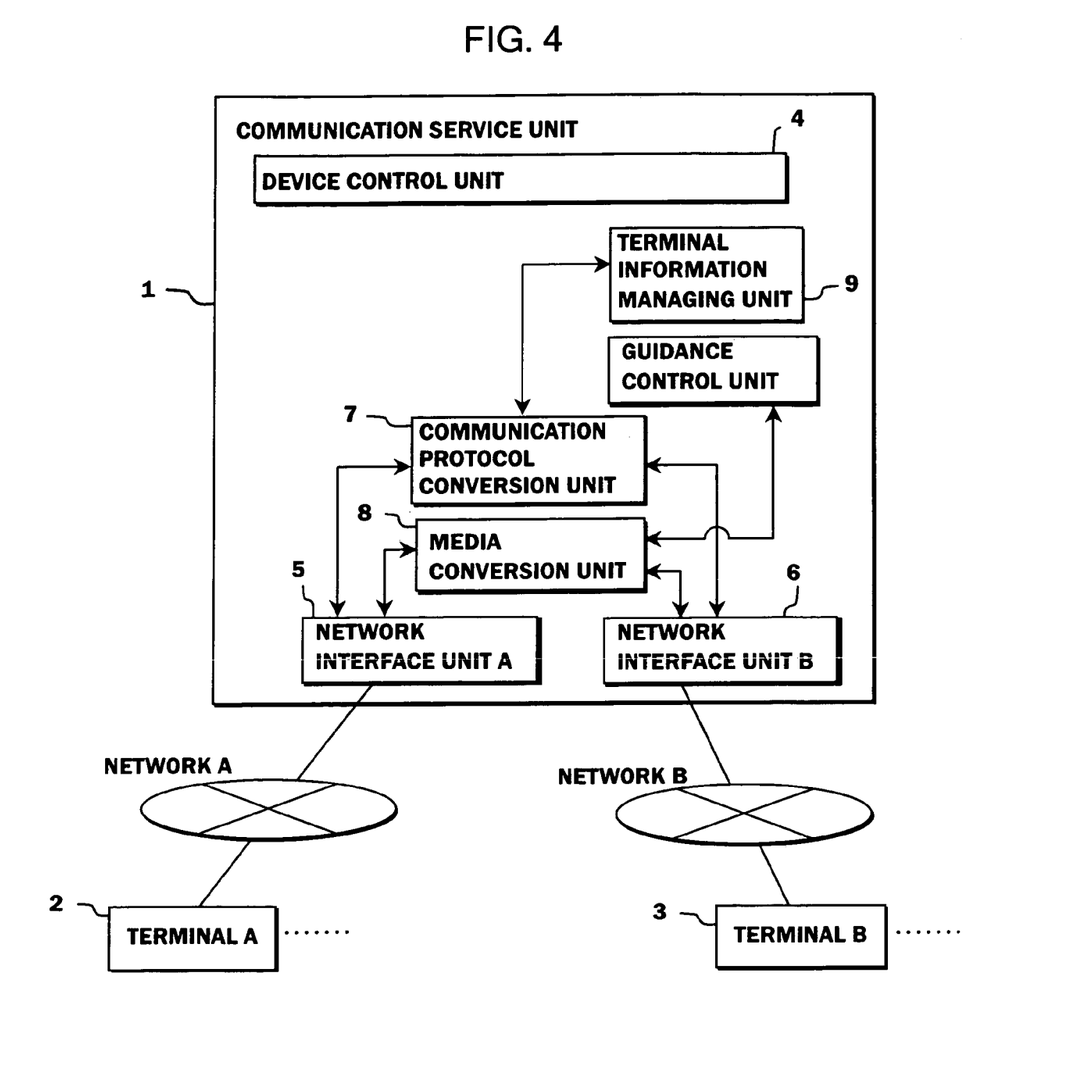
FIG. 4 is a block diagram illustrating a communication service unit according to Embodiment 4 of the invention.

FIG. 4 is a block diagram illustrating a communication service unit according to Embodiment 4, to which this invention is applied. In addition, the configuration of the communication service unit in Embodiment 4 is, except for a guidance control unit 40, the same as the configuration of the communication service unit in Embodiment 1.

In FIG. 4, "40" is the guidance control unit that manages streams encoded from media information such as video or audio; when communication start is requested from a multimedia terminal, although the terminal information related to the multimedia terminal has not been registered in the database, the guidance control unit establishes, to obtain the terminal information, quasi multimedia communication between the communication service unit 1 and the guidance control unit; and, at this moment, the unit reports encoded media information equivalent to guidance video such as that for explaining communication status or an operational procedure from the communication service unit 1 to the corresponding multimedia terminal.

Next, the operations in Embodiment 4 are explained.

Here, as an example, operations in mutual communication from the multimedia terminal 2 to the multimedia terminal 3 through the communication service unit 1 are explained. When the terminal information related to the multimedia terminal 2, which is a calling terminal does not exist in the database as described in FIG. 3, quasi multimedia communication is established after having established a communication path between the multimedia terminal 2 and the communication service unit 1, and exchanged a series of communication message or media control message, which are necessary for establishment of the communication path and establishment of media transmission, so as to obtain the terminal information related to the calling terminal.

At this moment, in Embodiment 4, guidance video for explaining status is reported from a guidance control unit 40 to the multimedia terminal 2, which is a calling terminal, while quasi multi media communication that has been established between the multimedia terminal 2 and the communication service unit 1, is being executed. For example, in cases that an operator of the multimedia terminal 2 needs to once terminate communication and restart the communication to the multimedia terminal 3, guidance video is reported for explaining the status to the operator of the multimedia terminal 2. Meanwhile, in cases, while the quasi multimedia communication established between the multimedia terminal 2 and the communication service unit 1 is held, multimedia communication from the communication service unit 1 to the multimedia terminal 3 is established, and the communication progresses to multimedia communication between the multimedia terminal 2 and the multimedia terminal 3, guidance video for explaining the situation is reported to the operator of the multimedia terminal 2 while the communication is in progress toward the final communication state. Moreover, it goes without saying that the guidance video may contain not only video but also audio.

According to Embodiment 4 as described above, even if the terminal information, which is necessary for the communication procedure, is insufficient when mutual communication is executed between the multimedia terminal 2 and the multimedia terminal 3 having communication procedures differing from each other, an effect can be exerted, in which, in the communication service unit 1, the terminal information can be automatically obtained from the calling terminal without inputting information in accordance with complicated procedures by the operator, and the operator can easily establish multimedia communication to the destination terminal by informing the operator of the calling terminal of guidance video for explaining operational status.

Embodiment 5

Because a block diagram of Embodiment 5 is identical to FIG. 1, which is the block diagram of Embodiment 1, explanation of the configuration is omitted, and operations of Embodiment 5 are explained.

Figure 5:
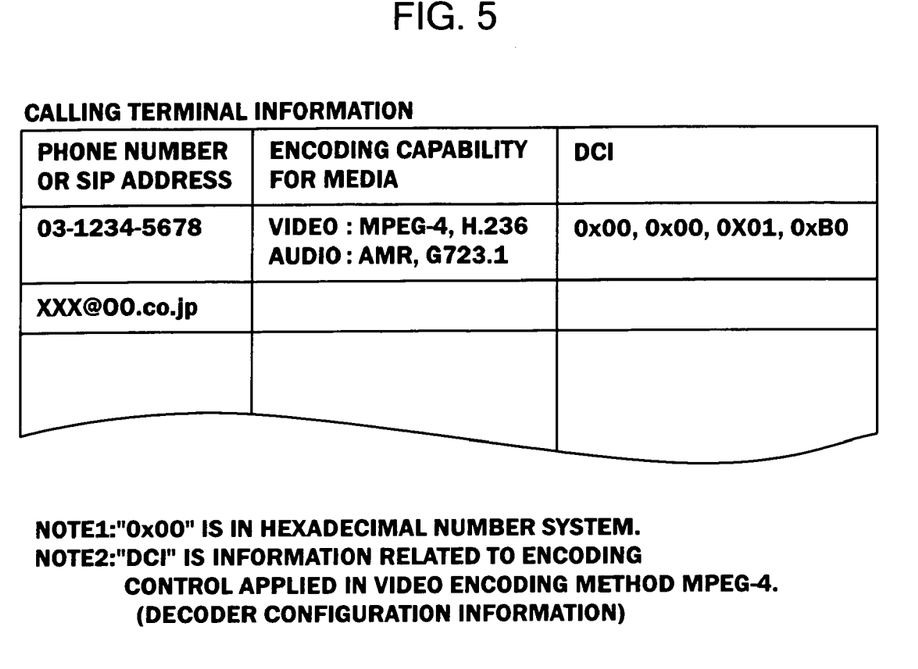
FIG. 5 is a diagram illustrating an example of terminal information related to a calling terminal whose information is retrieved in the communication service unit 1 in Embodiment 5.

FIG. 5 is a diagram illustrating an example of terminal information related to the calling terminal retrieved in the communication service unit 1 in Embodiment 5.

In the database related to the terminal information referred by the terminal information managing unit 9 in retrieving process 23 of the terminal information, various information related to media control messages that are exchanged among terminals when the calling terminal communicates to other multimedia terminals. The terminal information includes; an identification number for specifying the calling terminal, for example, a transmitting phone number on circuit exchanging network in the case of a multimedia terminal in conformity with the ITU-T Recommendation, H.324, or a terminal address referred to as the SIP-URL in the case of a multimedia terminal in conformity with the IETF Standard, SIP; a media encoding capability that can be applied to media information such as video or audio that the terminal can transmit, for example, a video encoding method or audio encoding method such as the MPEG-4 Visual or H.263, the AMR, and G.723.1; and unique information to each media encoding method, for example, the DCI (decoder configuration information) as encoding information in the case of applying the MPEG-4 Visual to the video encoding method.

When mutual communication from the multimedia terminal 2 to the multimedia terminal 3 is executed, an identification number is reported as illustrated in FIG. 2, in which it serves for specifying the calling terminal in accordance with the communication start request 20 from the multimedia terminal 2. Therefore, if the terminal information related to the calling terminal is registered in the database correlating the information to the identification number for specifying the calling terminal, the terminal can be easily retrieved by applying the reported identification number.

Moreover, similarly to Embodiments 1 to 4 described above, the database in which the terminal information has been stored may be managed in the communication service unit 1, or may be unitarily managed to be inquired, by a dedicated server outside the communication service unit 1. If the database is unitarily managed by a dedicated server outside the communication service unit 1, it is clear that the procedure, which is the same method as that for inquiring and registering the terminal information between the communication protocol conversion unit 7 and the terminal information managing unit 9 in the communication service unit 1, can be realized by inquiring and registering the terminal information between the communication service unit 1 and the dedicated server. Then, because the terminal information related to the calling terminal is held in the dedicated server, the system can easily be extended without making any particular arrangements, even when the number of the communication service unit 1 increases to plural.

According to Embodiment 5 as described above, if the terminal information, which is necessary for communication procedure, is insufficient when mutual communication is executed between the multimedia terminal 2 and the multimedia terminal 3 having communication procedures differing from each other, an effect can be obtained, in which necessary information can be swiftly retrieved at the communication start with the multimedia terminal, by managing various terminal information necessary for multimedia communication correlating the terminal information to the identification number for specifying the calling terminal. Moreover, if the information related to the calling terminal is unitarily managed by the dedicated server outside the communication service unit 1, an effect can be obtained, in which the system can be easily extended even in the case of constructing the system with a plurality of communication service unit 1.

Embodiment 6

Because a block diagram of Embodiment 6 is identical to FIG. 1, which is the block diagram of Embodiment 1, explanation of the configuration is omitted. Here, as an example, an operation in mutual communication from the multimedia terminal 2 to the multimedia terminal 3 through the communication service unit 1 is explained.

Figure 6:
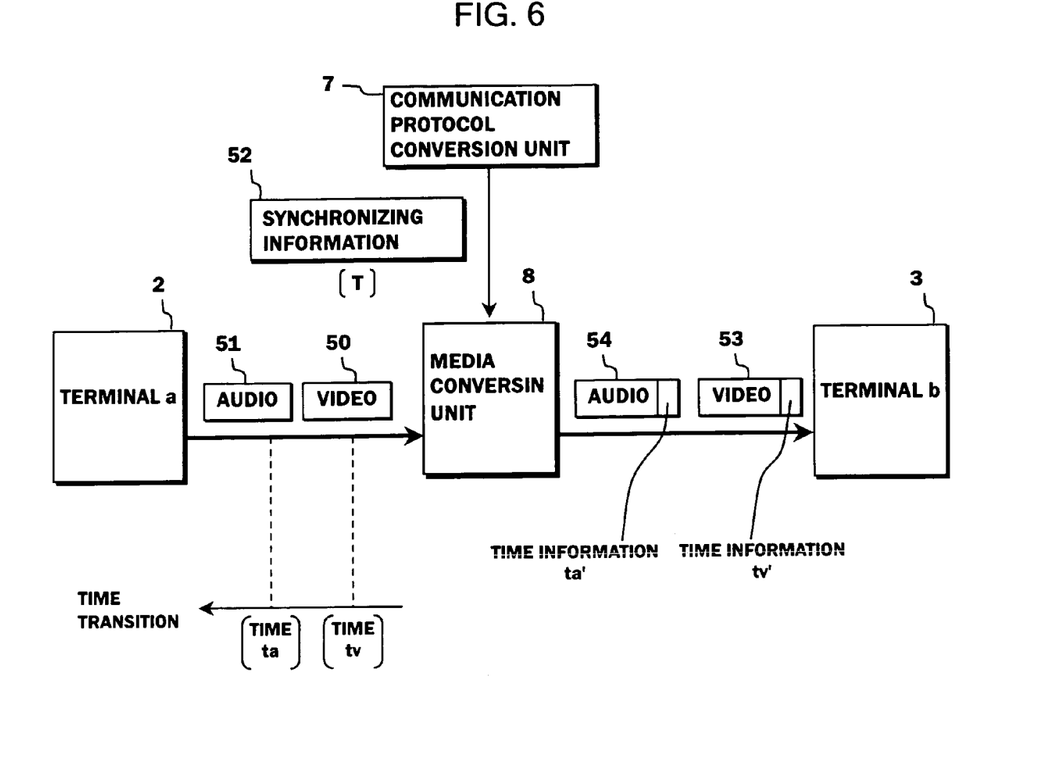
FIG. 6 is a diagram illustrating an example of conversion of encoded media information such as video or audio in Embodiment 6.

FIG. 6 is a diagram illustrating a conversion example of encoded media information such as video or audio in Embodiment 6.

In FIG. 6, "50" and "51" are video media information and audio media information reported from the multimedia terminal 2 to the communication service unit 1, and "52" is synchronizing information that has been recorded as prior information to the multimedia terminal 2 and is necessary for the called terminal side for synchronously reproducing the video media information and the audio media information. "53" and "54" are video media information and audio media information that are appropriately converted by the media conversion unit 8 from the video media information 50 and the audio media information 51, and then reported from the communication service unit 1 to the multimedia terminal 1.

Next, operations in Embodiment 6 are explained.

In Embodiment 6 of the invention, for example, it is assumed that though the multimedia terminal 2 has a means for informing of the synchronizing information 52 in accordance with a communication procedure, the multimedia terminal 3 does not have a means for informing of information corresponding to the synchronizing information 52, but has different procedures such as a procedure to add time information to each of packets that transmit media information such as video or audio.

Here, for example, it is given that the value of the synchronizing information 52 registered in the terminal information of the multimedia terminal 2 is, for example, "T", the receiving time of the video media information 50 reported from the multimedia terminal 2 is "tv", and similarly the receiving time of the audio media information 51 is "ta". In the media conversion unit 9, the value of the synchronizing information 52 is applied to correct the receiving times of the video media information 50 and the audio media information 51 in the communication service unit 1, and then the corrected times are reflected on time information "tv'" and "ta'" that are added to the video media information 53 and the audio media information 54, which are reported to the multimedia terminal 3. For example, regarding the time information "tv'" and "ta'", that are given to the video media information 53, when the times received from the multimedia terminal 2 are applied directly, and conversion process given by "tv'"="tv+α" is executed, the time information "ta'", which is given to the audio media information 54, is added with only "T" minutes from the synchronizing information 52, resulting in "ta'"="ta+α+T". At this moment, regarding the time information "tv'" and "ta'" that are given to the video media information 53 and 54, respectively, the fixed offset value "α" may be decided and be applied to their corrections, taking a process delay time in the communication service unit 1 into consideration.

According to Embodiment 6 as described above, when mutual communication is executed between the multimedia terminal 2 and the multimedia terminal 3 having communication procedures differing from each other, an effect can be obtained, in which relay process in which time synchronizing is maintained among plural media information items with respect to multimedia terminals without procedures to inform of the synchronizing information, by holding, as the terminal information of the calling terminal, the synchronizing information for synchronously reproducing, at the receiving side, media information such as video or audio, and by adjusting time information given to each media information based on the synchronizing information.

Embodiment 7

Because the block diagram of Embodiment 7 is identical to FIG. 1, which is the block diagram of Embodiment 1, explanation of the configuration is omitted. In this case, as an example, operations in mutual communication from the multimedia terminal 2 to the multimedia terminal 3 through the communication service unit 1 are explained.

Figure 7:
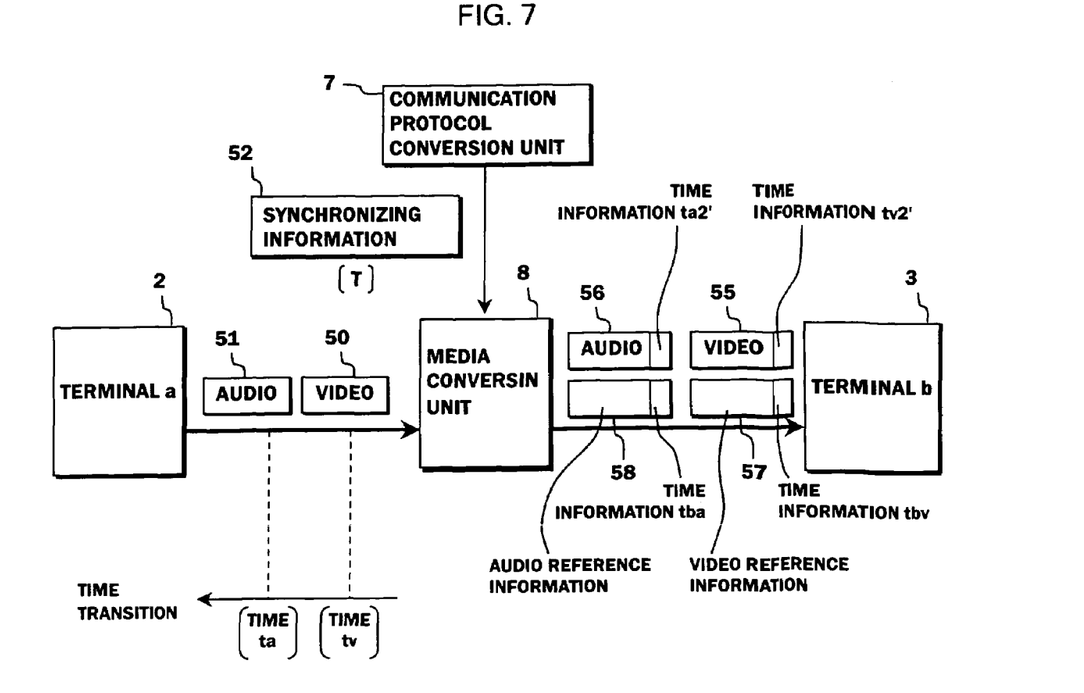
FIG. 7 is a diagram illustrating an example of conversion of encoded media information such as video or audio in Embodiment 7.

FIG. 7 is a diagram illustrating an example of conversion of encoded media information such as video or audio in Embodiment 7.

In FIG. 7, "55" and "56" are video media information and audio media information that are appropriately conversion-processed by the media conversion unit 8 with respect to the video media information 50 and the audio media information 51, and reported from the communication service unit 1 to the multimedia terminal 3, and "57" and "58" are reference time information to report the video media information "55" and the audio media information "56" of reproducing timing.

Next, operations of Embodiment 7 are explained.

In Embodiment 7 of the invention, an example is assumed such that the multimedia terminal 2 has a means for informing of the synchronizing information 52 in accordance with its communication procedure, meanwhile the multimedia terminal 3 does not have a means for informing of information corresponding to the synchronizing information 52, but has different procedures such as that gives time information to each packets in which media information such as video or audio is transmitted, and informs of the media information, and also informs of time information, which is the time information reference of each media information.

Given that the value of the synchronizing information 52 registered in the terminal information of the multimedia terminal 2 is, for example, "T", the receiving time of the video media information 50 reported from the multimedia terminal 2 is "tv", and the receiving time of the audio media information 51 is "ta", the media conversion unit 9 applies the value of the synchronizing information 52 to correct in the communication service unit 1, receiving times of the video media information 50 and the audio media information 51. At this moment, if a conversion process is executed to the time information "tv2'" and "ta2'", which are given to the video media information 53 and the audio media information 54, in such a way that "tv2'"="tv+α" and "ta2'"="ta+α" in accordance with the times reported to the communication service unit 1, the time information is reflected on the time information "tbv'" and "tba'", which are time information references with respect to each media information. For example, the time information "tba'", which is the reference to the audio media information 56, is added with "T" minutes to the synchronizing information 52 resulting in "tba'"="ta+β+T", if the times received from the multimedia terminal 2 are directly applied to the time information "tbv'", which is the reference to the video media information 55, and a conversion process given by "tbv'"="tv+β" is executed. At this moment, with respect to the time information "tv2'" and "ta2'" that are given to the video media information 55 and 56 or with respect to the time information "tbv'" and "tba'" that are the reference to each media information, the fixed offset value "α" and "β" may be decided and be applied to their correction taking a processing delay time in the communication service unit 1 into consideration.

According to Embodiment 7 as described above, when mutual communication is executed between the multimedia terminal 2 and the multimedia terminal 3 having communication procedures differing from each other, an effect can be obtained, in which relay process in which time synchronizing is matched among plural media information items with respect to multimedia terminals without procedures to inform of the synchronizing information, by holding, as the terminal information of the calling terminal, the synchronizing information for synchronously reproducing, at the receiving side, media information such as, video or audio, and by adjusting time information that is the time information reference given to each media information based on the synchronizing information.

What is claimed is:

1. A communication service method, comprising:
    establishing a communication link between a first terminal supporting a first communication protocol and a communication service unit configured to convert a received first communication message, sent by the first terminal and complying with the first communication protocol, to a second communication message complying with a second communication protocol for transmitting the second communication message to a second terminal supporting the second communication protocol;

obtaining at the communication service unit terminal information related to the first terminal from the first terminal through the communication link between the first terminal and the communication service unit, the terminal information to be used for executing a sequence for connecting the first terminal to the second terminal; and recording the terminal information of the first terminal obtained through the communication link in a database accessible by the communication service unit.

2. A communication service method according to claim 1, further comprising:

establishing a communication link between the communication service unit and the second terminal after the recording.

3. A communication service method according to claim 1, further comprising:

transmitting guidance for explaining communication status or operation methods from the communication service unit to the first terminal.

4. A communication service method according to claim 1, further comprising:

said communication service unit correlating the obtained terminal information of the first terminal with an identification number of the first terminal allocated to the first terminal to be identified on a network; and the recording comprising recording the terminal information of the first terminal correlated with the identification number of the first terminal.

5. A communication service method according to claim 1, wherein the establishing comprising:

receiving at the communication service unit terminal information including at least one of an encoding-method classification for media that is to be applied during a multimedia communication, unique information for each encoding-method classification for media, and a moving parameter related to encoding.

6. A communication service method according to claim 1, wherein the establishing comprising:

receiving at the communication service unit terminal information including synchronizing timing information to be used to synchronize different kinds of media information under the first communication protocol;

the communication service method further comprising:

allocating timing information to be used under the second communication protocol to media information to be relayed by the communication service unit from the first terminal to the second terminal;

adjusting the timing information based on the synchronizing timing information; and relaying the adjusted timing information and the media information to the second terminal via the communication service unit.

7. A communication service method according to claim 1, wherein the establishing comprising:

receiving at the communication service unit terminal information including synchronizing timing information to be used to synchronize different kinds of media information under the first communication protocol;

the communication service method further comprising:

allocating time information to be used under the second communication protocol to media information to be relayed by the communication service unit from the first terminal to the second terminal;

adjusting, based on the synchronizing timing information, reference information serving as a reference of the time information under the second communication protocol; and relaying the adjusted reference information, the time information and the media information to the second terminal via the communication service unit.

8. A communication service method according to claim 1, further comprising:

managing the data base in the recording in an external server.

9. A communication service method, comprising:

establishing a communication link between a first terminal supporting a first communication protocol and a communication service unit configured to convert a received first communication message, sent by the first terminal and complying with the first communication protocol, to a second communication message complying with a second communication protocol for transmitting the second communication message to a second terminal supporting the second communication protocol;

obtaining at the communication service unit terminal information related to the first terminal the terminal information including at least one of an encoding-method classification for media of the first terminal to be applied during a multimedia communication and unique information for encoding-method classification for media of the first terminal from the first terminal through the communication between the first terminal and the communication service unit; and converting at the communication service unit the received first communication message, sent by the first terminal and complying with the first communication protocol to the second communication message complying with the second communication protocol based on the obtained terminal information related to the first terminal.

10. A communication service method according to claim 9, further comprising:

recording the obtained terminal information of the first terminal in a database accessibly by the communication service unit.

* * * * *